United States Patent
Serman (10) Patent No.: US 7,086,433 B1
(45) Date of Patent: Aug. 8, 2006

(54) TREE FELLING ASSEMBLY

(76) Inventor: Robert F. Serman, 103 Dallas County Road 269, Selma, AL (US) 36701

(*) Notice: Subject to any disclaimer, the term of this patent is extended or adjusted under 35 U.S.C. 154(b) by 230 days.

(21) Appl. No.: 10/643,171

(22) Filed: Dec. 4, 2003

(51) Int. Cl.
A01G 23/08 (2006.01)

(52) U.S. Cl. .................... 144/34.1; 144/34.2; 144/336; 254/394

(58) Field of Classification Search ............... 144/34.1, 144/34.2, 335, 336; 254/389, 390, 393, 394, 254/335, 338, 30, 132; 294/119.2, 82.14
See application file for complete search history.

(56) References Cited

U.S. PATENT DOCUMENTS

| | | | | |
|---|---|---|---|---|
| 1,412,956 A | * | 4/1922 | Nelson | 254/289 |
| 1,470,377 A | | 10/1923 | Kimberling | |
| 1,649,837 A | * | 11/1927 | Maitland | 254/393 |
| 1,761,425 A | * | 6/1930 | Buehler | 254/337 |
| 1,826,303 A | * | 10/1931 | Dickinson | 104/112 |
| 2,669,425 A | * | 2/1954 | Montgomery | 254/390 |
| 2,707,615 A | * | 5/1955 | Green | 254/100 |
| 2,759,234 A | * | 8/1956 | Brawand | 24/115 R |
| 3,219,075 A | | 11/1965 | Roberts et al. | |
| 3,548,899 A | * | 12/1970 | Emerson | 144/336 |
| 4,148,462 A | * | 4/1979 | Jessup | 254/133 R |
| 4,216,940 A | | 8/1980 | Martin | |
| RE31,481 E | * | 1/1984 | Choat | 144/34.5 |
| 5,735,323 A | * | 4/1998 | Maloch | 144/34.1 |
| 6,604,562 B1 | * | 8/2003 | Smith | 144/34.2 |
| 6,695,688 B1 | * | 2/2004 | Owen et al. | 452/187 |

* cited by examiner

*Primary Examiner*—Bena Miller
(74) *Attorney, Agent, or Firm*—Kenneth M. Bush; Bush IP Law Group, LLC (57) ABSTRACT

An assembly for felling a segment of a tree trunk in a safe and controlled manner and method of using the same. The assembly comprises a vertical support structure having an elongated base portion, an elongated mast portion connected to the base portion or integrally formed therewith and having at least a portion extending upwardly therefrom, and a horizontal lip extending from the base or integrally formed therewith for contacting engagement with a conventional notch formed in the trunk. The method of felling a tree trunk comprises positioning the tree felling assembly along the trunk, cutting a conventional notch in the trunk below the assembly, the notch having a lower surface, repositioning the assembly along the trunk so that the lip is in contacting engagement with at least a portion of the lower surface, securing the assembly to the trunk below the segment, cutting the segment from the trunk, and lowering the segment from the trunk along a take-away cable operatively engaging the assembly.

26 Claims, 6 Drawing Sheets

TREE FELLING ASSEMBLY

FIELD OF THE INVENTION

The present invention relates to the field of tree removal, and with more particularity, to the cutting of delimbed tree trunks. With greater particularity, the present invention relates to a tree felling assembly and method of using the same for felling a tree trunk in a safe and controlled manner.

BACKGROUND OF THE INVENTION

Tree removal work activities are widely regarded as dangerous, and should only be performed by highly skilled professionals. Most homeowners do not have the necessary equipment or requisite skill to remove a tree, and must resort to hiring a tree removal service, often at great expense. Of paramount importance in conducting removal activities is the safety of the workers performing the tree removal. Utilizing conventional tree felling techniques and equipment, however, even professional tree workers are at a high risk of serious injury during tree removal from falling branches.

In addition to worker safety, another significant concern in the tree removal business is preventing property damage during tree removal process. Utilizing conventional tree felling techniques and equipment, there is a high risk of a falling tree or falling portions thereof such as branches or tree trunk segments damaging property. This can include damage to a home, vehicles, power and utility lines, roads, and other trees. Additional hazards resulting from tree removal activities include damage to landscaping, fencing, and lighting structures adjacent to the removed tree. As a result of these hazards, insurance rates for tree removal businesses are high as are the resulting fees for tree-removal services.

There are many instances in which it is necessary to remove a tree in a timely manner. For instance, a dead tree should be removed promptly, especially if it is in an area that can cause personal injury or property damage if it fell. Trees that suffer significant decay should likewise be removed. Additionally, it may be necessary to remove a tree that has critical structural defects such as cracks. Otherwise, such trees can fall in an uncontrolled and unpredictable manner such as during a severe storm. Unfortunately, the great expense associated with tree removal services, as well as the widely recognized hazards associated with tree removal activities, provide a disincentive to tree removal in a timely manner.

From the foregoing it may be seen that there is a significant need for improved devices and techniques for felling trees, to reduce the hazards and expense associated with tree removal. A need exists for a tree felling assembly and method of using that same that overcomes the limitations of the prior art and enables trees to be felled and handled in a controlled and safe manner.

SUMMARY OF THE PRESENT INVENTION

It is an object of the present invention to provide an improved assembly for use in felling trees.

Another object of the present invention is to provide a tree felling assembly that fells trees in a safe and controlled manner.

An additional object of the present invention is to provide a tree felling assembly that is simple and inexpensive to use and manufacture.

A further object of the present invention is to provide an assembly for felling a tree trunk in segments thereof, and for safely lowering the removed segments from the trunk in a controlled manner to minimize the possibility of property damage in the proximity of the tree trunk.

Another object of the present invention is to provide an improved method for felling a tree in a safe and controlled manner.

A still further object of the present invention is to provide a method of felling a tree trunk in segments thereof and selectively lowering the segment to a drop zone.

A further object of the present invention is to provide a method of felling a tree trunk that produces trunk segments that are long enough to be sawn for lumber as opposed to merely trash or firewood.

These and other objects of the present invention are accomplished through the use of a tree felling assembly comprising a vertical support structure having an elongated base portion, an elongated mast portion connected to the base portion and having at least a portion extending upwardly therefrom, and a horizontal lip extending from the base or integrally formed therewith for contacting engagement with a conventional notch formed in the trunk. The lip provides vertical support for the tree felling assembly during the process of cutting a segment from the trunk and selectively lowering the segment to a drop zone. This significantly enhances the stability and safety of the present invention during use.

The tree felling assembly further comprises a top eyelet connected to or integrally formed with the back surface of the mast proximate its distal end, and a first pulley block connected thereto. The tree felling assembly further comprises a back eyelet positioned on or integrally formed with the back surface of the vertical support structure. A lowering eyelet is positioned on or integrally formed with the forward surface of the mast proximate the lip. The tree felling assembly further comprises a take-away cable operatively connected to the vertical support structure and extending generally downward therefrom to the ground below.

The take-away cable is used to lower and guide segments that have been cut from the tree trunk in a controlled manner. More specifically, during use of the tree felling assembly, a portion of the take-away cable is positioned above a drop zone onto which the segment is placed after being removed from the trunk. The drop zone may be the bed of a truck, allowing removed segments to be taken directly from the tree trunk onto means for transporting the segments from the worksite without additional on-site cutting or loading activities. Alternatively, the drop zone may be at grade in an optimum location where the removed segments may be stored or further processed. It can be appreciated that the present invention allows for felling a tree trunk in a controlled manner without causing damage to adjacent structures.

These and other objects and advantages of the invention will become apparent from the following detailed description of the preferred embodiment of the invention.

BRIEF DESCRIPTION OF THE DRAWINGS

A tree felling assembly embodying the features of the present invention is depicted in the accompanying drawings which form a portion of this disclosure and wherein.

DESCRIPTION OF THE PREFERRED EMBODIMENT

The present invention provides a tree felling assembly 10 for use in felling a tree trunk 11 in a safe and controlled manner. The assembly 10 provides for felling a tree trunk 11 in segments 11a thereof, and for safely lowering the removed segments from the trunk 11 in a controlled manner, thereby minimizing the possibility of property damage in the proximity of the tree trunk 11. Referring to FIGS. 1–10 for a clearer understanding of the invention, it may be seen that the preferred embodiment of the tree felling assembly 10 comprises a vertical support structure having an elongated base portion 12, an elongated mast portion 14 connected to the base portion 12 and having at least a portion extending upwardly therefrom, and a horizontal lip 16 extending from the base 12 or integrally formed therewith for contacting engagement with a conventional notch 18 formed in the trunk 11. The present invention is utilized to fell a tree trunk 11 that has been delimbed.

Figures 4, 5, 6:
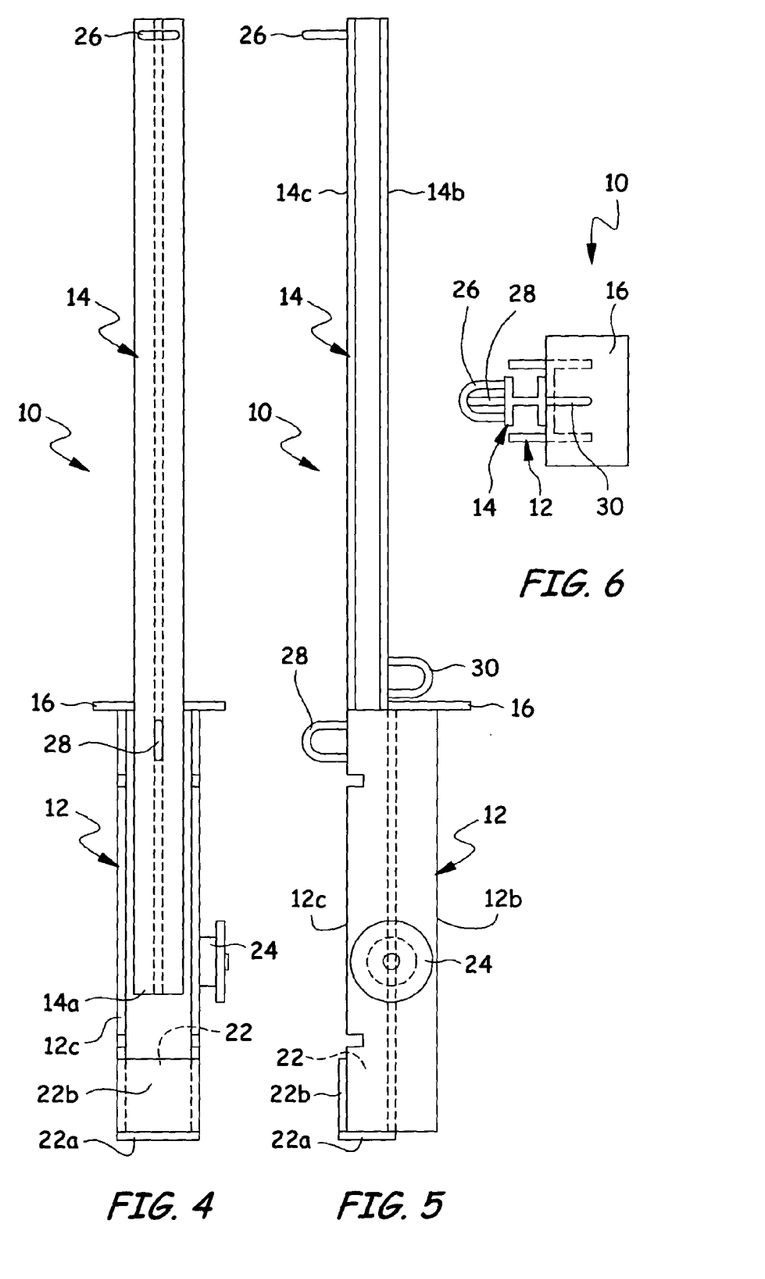
FIG. 4 is a rear elevational view of the preferred embodiment of a tree felling assembly.
FIG. 5 is a right side elevational view of the preferred embodiment of a tree felling assembly.
FIG. 6 is a top plan view of the preferred embodiment of tree felling assembly.
Figure 7A:
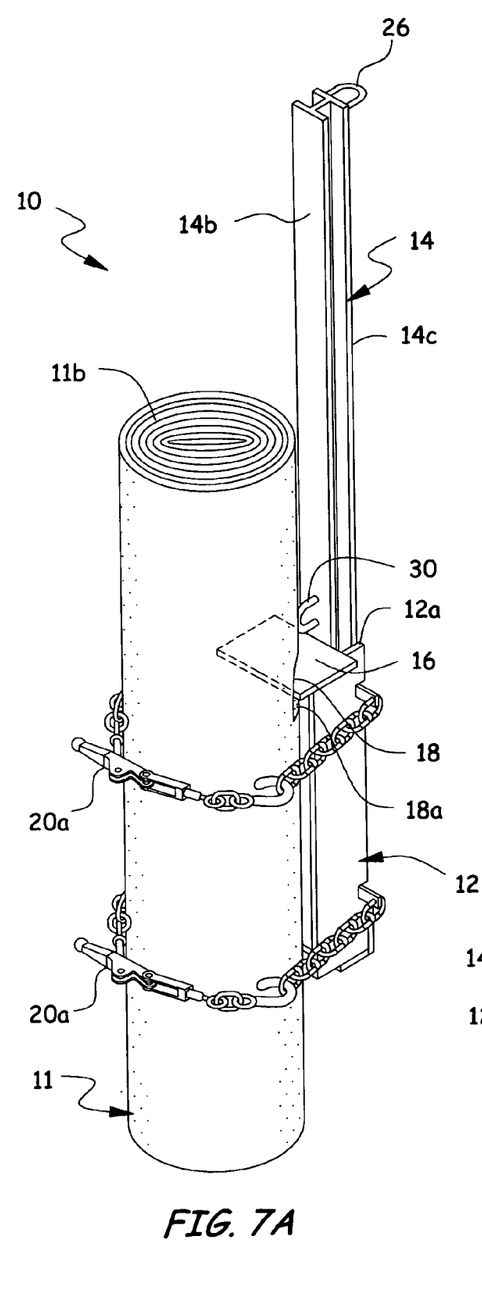
FIG. 7A is a perspective view of the preferred embodiment of a tree felling assembly secured to a tree trunk prior to cutting a segment therefrom.
Figure 7B:
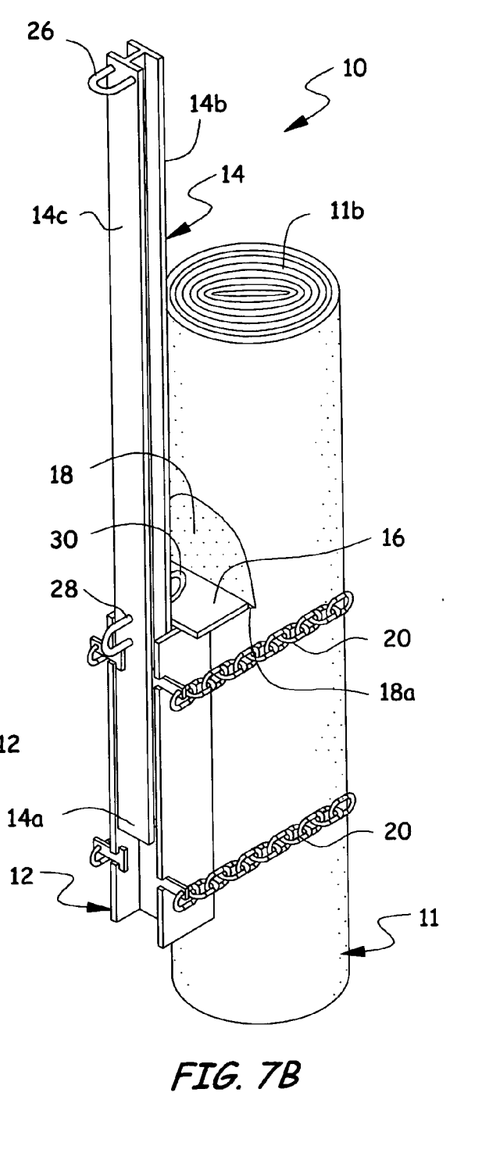
FIG. 7B is a perspective view of the preferred embodiment of a tree felling assembly secured to a tree trunk prior to cutting a segment therefrom.

The lip 16 is connected to or integrally formed with the base 12 and projects forward therefrom, as shown in FIG. 5. The lip 16 has a bottom surface (not shown) for contacting engagement with at least a portion of a lower surface 18a of the notch. As shown in FIGS. 7A and 7B, the lip 16 is sized to rest within the notch 18 when the assembly is in position for use. In this manner, the lip 16 provides vertical support for the tree felling assembly 10 during the process of cutting a segment 11a from the trunk and selectively lowering the segment 11a to a drop zone 42. In addition to a base 12, mast 14, and lip 16, the present invention further comprises means for securing the base 12 to the trunk 11. Because the lip 16 of the present invention provides vertical support for the assembly, the means for securing the base 12 to the trunk 11 is thereby relieved from carrying the vertical load. This significantly enhances the stability and safety of the present invention during use. The assembly 10 provides a safe method of felling a tree trunk 11 in a controlled manner. In the preferred embodiment, the means for securing comprises at least one chain binder 20 connected at opposite ends thereof to the base 12. It is contemplated that the present invention may utilize other such means for securing the base 12 to the trunk 11 as are well known in the art. In the preferred embodiment, the chain binders 20 further comprise means for tightening, namely, chain clamp assemblies 20a, that allow the base 12 to be readily secured to the tree trunk 11 after it has been properly positioned.

Figure 1:
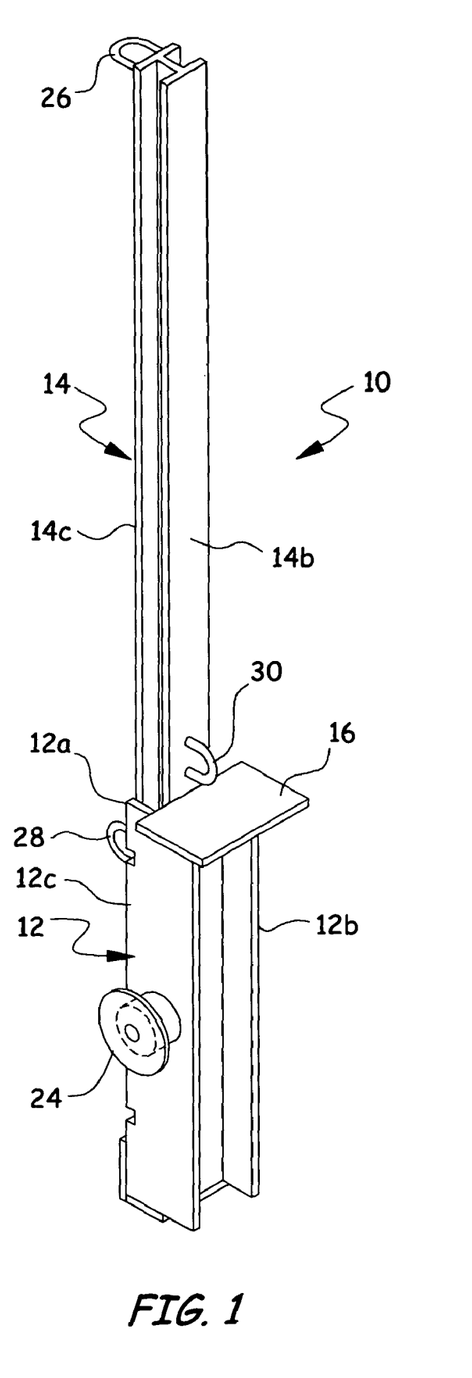
FIG. 1 is a first perspective view of the preferred embodiment of a tree felling assembly.
Figure 3:
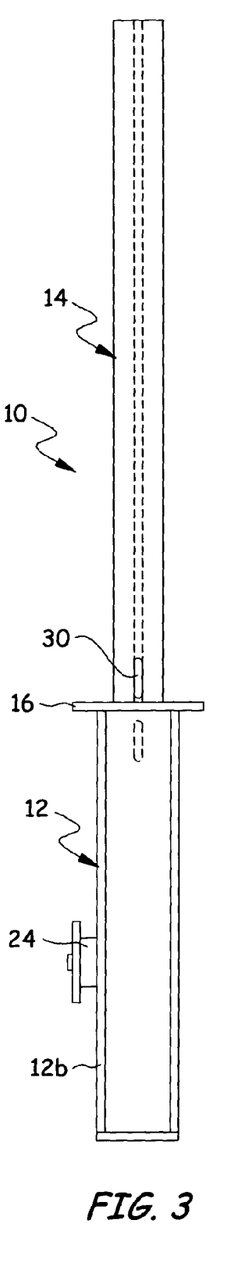
FIG. 3 is front elevational view of the preferred embodiment of a tree felling assembly.

In the preferred embodiment, as shown in FIGS. 1 and 6, the base 12 is comprised of an elongated, rigid I-beam having an upper surface 12a, a front surface 12b, and a back surface 12c. The lip 16 is positioned on the upper surface 12a of the base and has a portion extending forward of the front surface 12b of the base. The lip has a lower surface (not shown), a portion of which is in contacting engagement with lower surface 18a of a conventional notch 18 when the assembly is secured to a tree trunk 11. When the vertical support structure is secured to the trunk 11, a portion of the front surface 12b of the base is in contacting engagement with the trunk 11. The base 12 of the preferred embodiment of the tree felling assembly 10 additionally has a storage compartment 22 for use in storing various tools and accessories, such as but not limited to hammers, ropes, pulley blocks, and eye bolts during use of the tree feller 10. The storage compartment 22 has an open top and is formed by the lower portion of the back surface 12c of the base with a bottom element 22a and side element 22b connected thereto. The storage compartment 22 may be utilized with an open top because the tree felling assembly 10 of the present invention maintains a generally vertical orientation during use, as further described below. The tree felling assembly 10 further comprises a snubbing ring 24 affixed to the base 12, as shown in FIGS. 1, 3, and 4, around which one or more ropes may be looped for purposes of securing or for manually controlling the rate at which the rope may be upwardly fed as the segment 11a is lowered.

Figure 2:
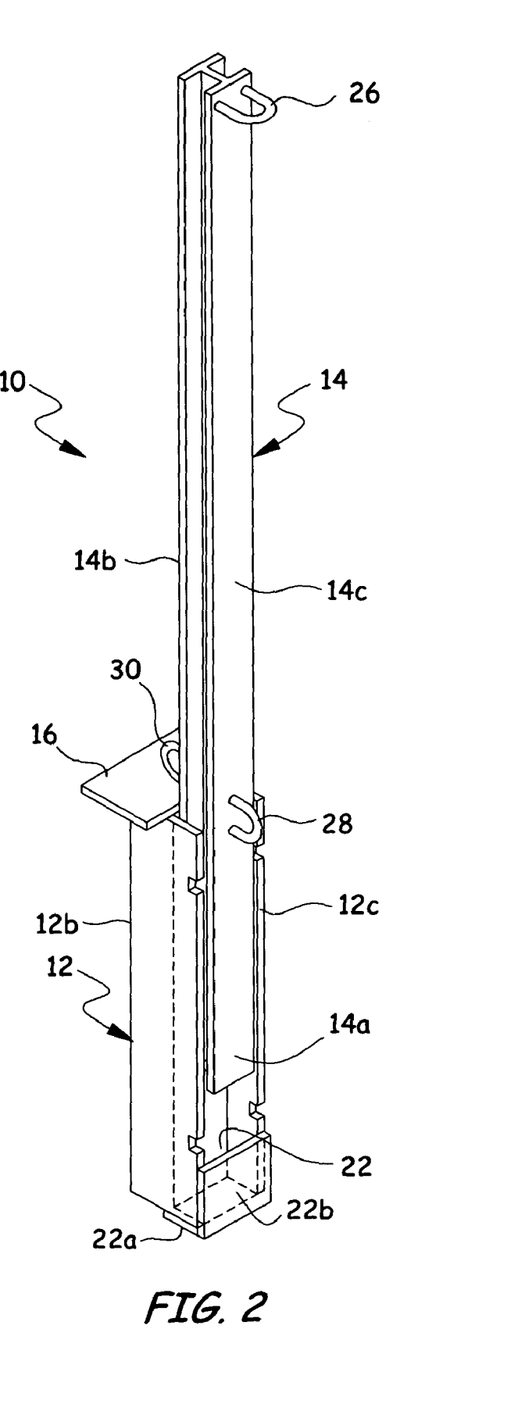
FIG. 2 is a second perspective view of the preferred embodiment of a tree felling assembly.

In the preferred embodiment, as shown in FIGS. 2 and 6, the mast 14 is comprised of an elongated, rigid I-beam generally smaller in proportion to the base 12, connected at its proximal end 14a to the base 12. The vertical support structure of the present invention is formed by the back surface 14c of the mast and the back surface 12c of the base, as shown in FIGS. 2 and 4. The tree felling assembly 10 further comprises a top eyelet 26 connected to or integrally formed with the back surface 14c of the mast 14 proximate its distal end, as shown in FIGS. 2 and 5, and a first pulley block 32 such as but not limited to a snatch block connected thereto. The tree felling assembly 10 further comprises a back eyelet 28, shown in FIGS. 2 and 5, positioned on or integrally formed with the back surface of the vertical support structure. As shown in FIGS. 1 and 5, a lowering eyelet 30 is positioned on or integrally formed with the forward surface 14b of the mast proximate the lip 16.

The tree felling assembly 10 comprises a take-away cable 40 operatively connected to the vertical support structure and extending generally downward therefrom to the ground below. The take-away cable 40 is used to lower and guide segments 11a that have been cut from the tree trunk 11 in a controlled manner. More specifically, during use of the tree felling assembly 10, a portion of the take-away cable 40 is positioned above a drop zone 42 onto which the segment 11a is placed after being removed from the trunk. The drop zone 42 may be the bed of a truck, allowing removed segments 11a to be taken directly from the tree trunk 11 onto means for transporting the segments 11a from the worksite without additional on-site cutting or loading activities. Alternatively, the drop zone 42 may be at grade in an optimum location where the removed segments 11a may be stored or further processed. It can be appreciated that the present invention allows for felling a tree trunk 11 in a controlled manner without causing damage to adjacent structures.

Figure 9:
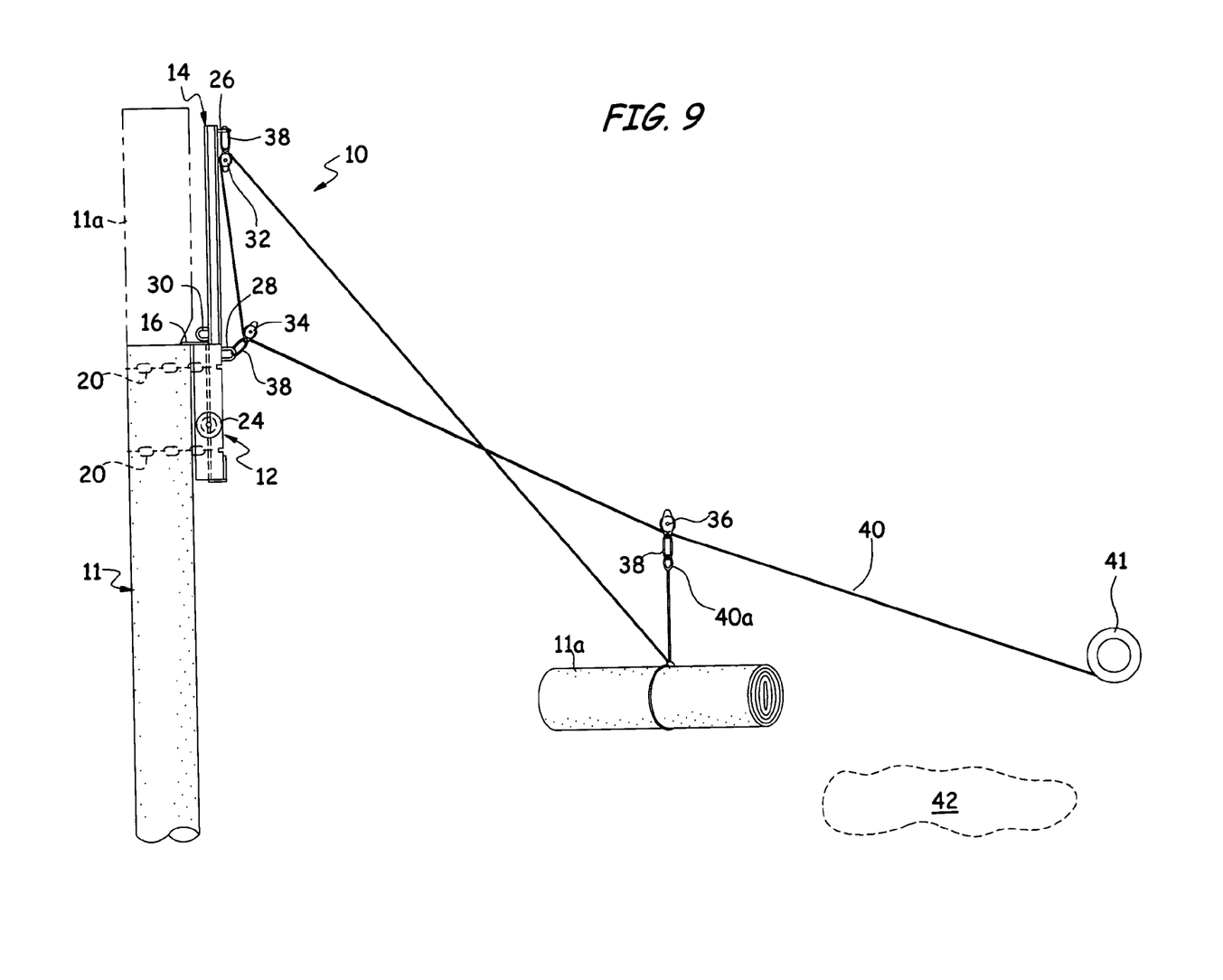
FIG. 9 is a perspective view of the preferred embodiment of a tree felling assembly during lowering of a tree trunk segment along a take-away cable operatively engaging the assembly.

The present invention further comprises a take-away pulley block 36 operatively engaging the take-away cable 40. In the preferred embodiment, as shown in FIG. 9, the take-away cable 40 operatively engages a second pulley block 34 connected to the back eyelet 28 and the first pulley block 32. In this embodiment, the upper end 40a of the take-away cable is connected to the take-away pulley block 36. In a second embodiment of the present invention, as shown on FIG. 10, the take-away cable 40 may be connected at its upper end 40a to the back eyelet 28. In both embodiments, the take-away cable 40 extends generally downwardly from the vertical support structure proximate the back eyelet 28 or second pulley block 34 to the drop zone 42. In both embodiments, the lower end of the take-away cable 40 may be operatively connected to a winch 41 or other means of tightening or feeding the take-away cable 40. The pulley blocks 32, 34, 36 may be connected to eyelets by connecting means well known in the art such as but not limited to connectors 38 such as shackles and snap rings.

The present invention comprises a method of progressively felling a tree trunk in segments, as described with reference to FIGS. 7–10. The tree felling method comprises positioning a tree felling assembly 10 along the trunk 11, the assembly having a base 12, horizontal lip 16 connected to the base 12 and projecting forward therefrom, and a mast 14 connected to the base 12 and having at least a portion extending upwardly from the base 12. This positioning step may occur during initial use of the tree felling assembly 10 prior to the removal of an uppermost segment of the trunk 11, or any subsequently removed segment 11a. The method further comprises the step of cutting a conventional notch 18 in the trunk 11 below the assembly 10, the notch 18 having a lower surface 18a.

The assembly 10 is then repositioned along the trunk 11 so that the lip 16 is in contacting engagement with at least a portion of the lower surface 18a of the notch. As shown in FIGS. 7A and 7B, the assembly 10 is then secured to the trunk below the segment 11a. The segment 11a is then cut from the trunk and lowered therefrom by and along a take-away cable 40 operatively engaging the assembly 10. The take-away cable 40 may be connected at its lower end to a winch 41 or other device utilized for taking slack out of the line. A portion of the take-away cable 40 is positioned above drop zone 42, and the segment 11a may then be selectively disengaged from the take-away cable 40 at the drop zone 42.

In the preferred embodiment, as shown in FIG. 9, the tree felling method further comprises the steps of affixing the upper end 40a of a take-away cable 40 to the segment 11a, and the step of engaging the take-away cable 40 with a first pulley block 32 connected to the mast 14 proximate a distal end thereof, and with a second pulley block 34 connected to a back surface of the assembly 10 prior to the cutting step. In the preferred embodiment, the method may further include the steps of attaching the segment 11a to the take-away pulley block 36 operatively engaging the take-away cable 40 prior to the lowering step. In this method, concomitant with the lowering step may be the step of selectively feeding the take-away cable 40 from the ground through the first and second pulley blocks 32, 34, thereby lowering the segment 11a from the trunk. The take-away cable 40 may be connected at its lower end to a winch 41 or other device utilized to feed the cable 40 to lower the segment 11a. This provides for lowering the segment 11a in a highly controlled manner. The segment 11a may then be selectively disengaged from the take-away cable 40 at the aforementioned drop zone 42.

Figure 10:
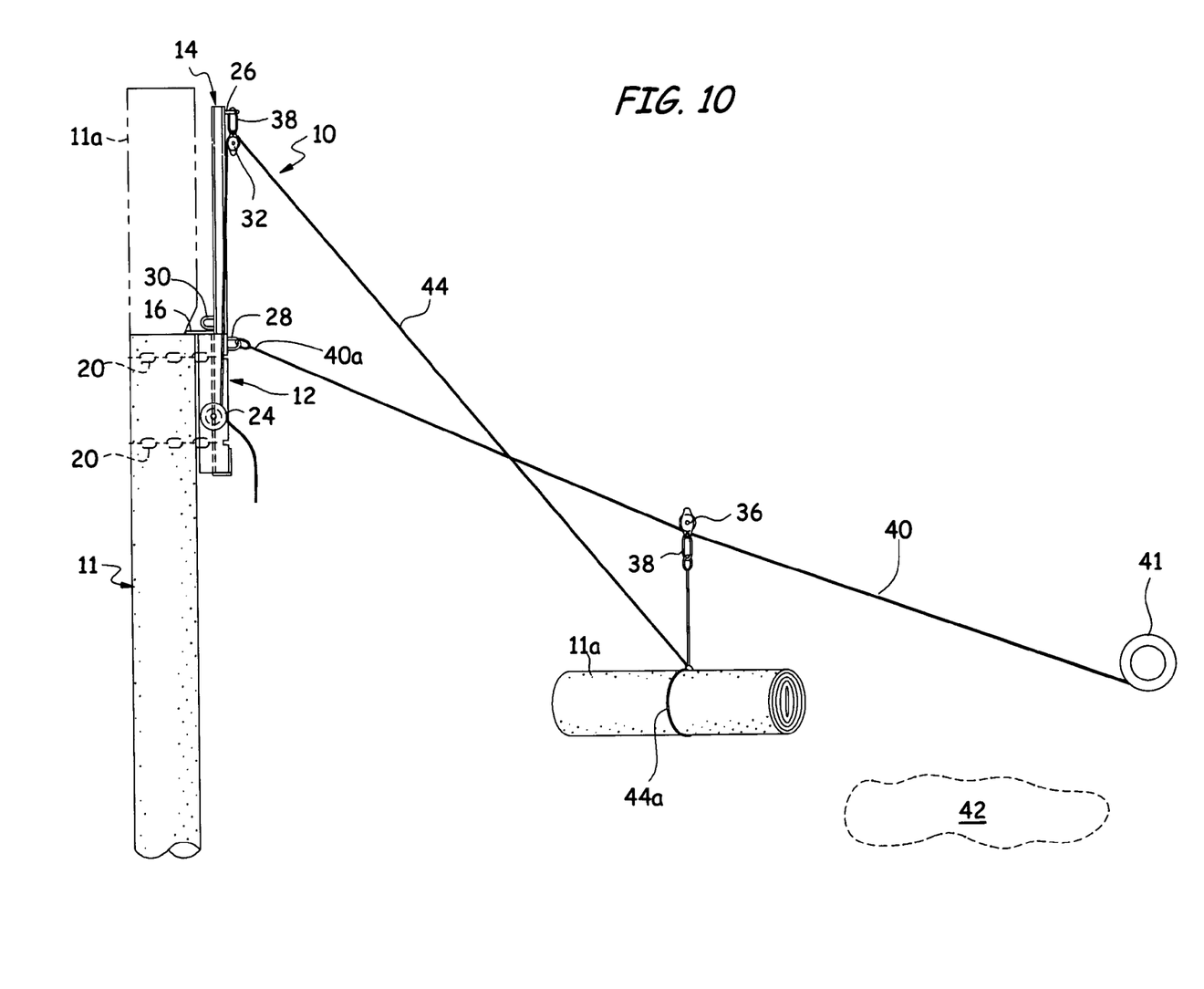
FIG. 10 is a perspective view of a second embodiment of a tree felling assembly during lowering of a tree trunk segment along a take-away cable operatively engaging the assembly.

In a second embodiment, as shown in FIG. 10, the tree felling method does not comprise affixing the upper end of a take-away cable 40a to the segment 11a. Instead, in this method the upper end 40a of the take-away cable is connected to the back eyelet 28 to which a take-away pulley block 36 is operatively engaged. The second method comprises the steps of affixing a first end 44a of a lowering rope 44 to a segment 11a, and engaging the lowering rope 44 with a first pulley block 32 connected to the mast 14 at a distal end thereof prior to the cutting step. This method may or may not include the step of looping a portion of the lowering rope 44 around a snubbing ring 24 affixed to the tree felling assembly base 12. This method may further comprise the steps of attaching the segment 11a to the take-away pulley block 36 prior to the lowering step, and thereafter concomitant with the lowering step, selectively feeding the lowering rope 44 through the first pulley block 32. In this manner the segment 11a is lowered from the trunk and vertical support structure in a controlled manner after which it may be selectively disengaged from the take-away cable 40 at the drop zone 42.

Figure 8:
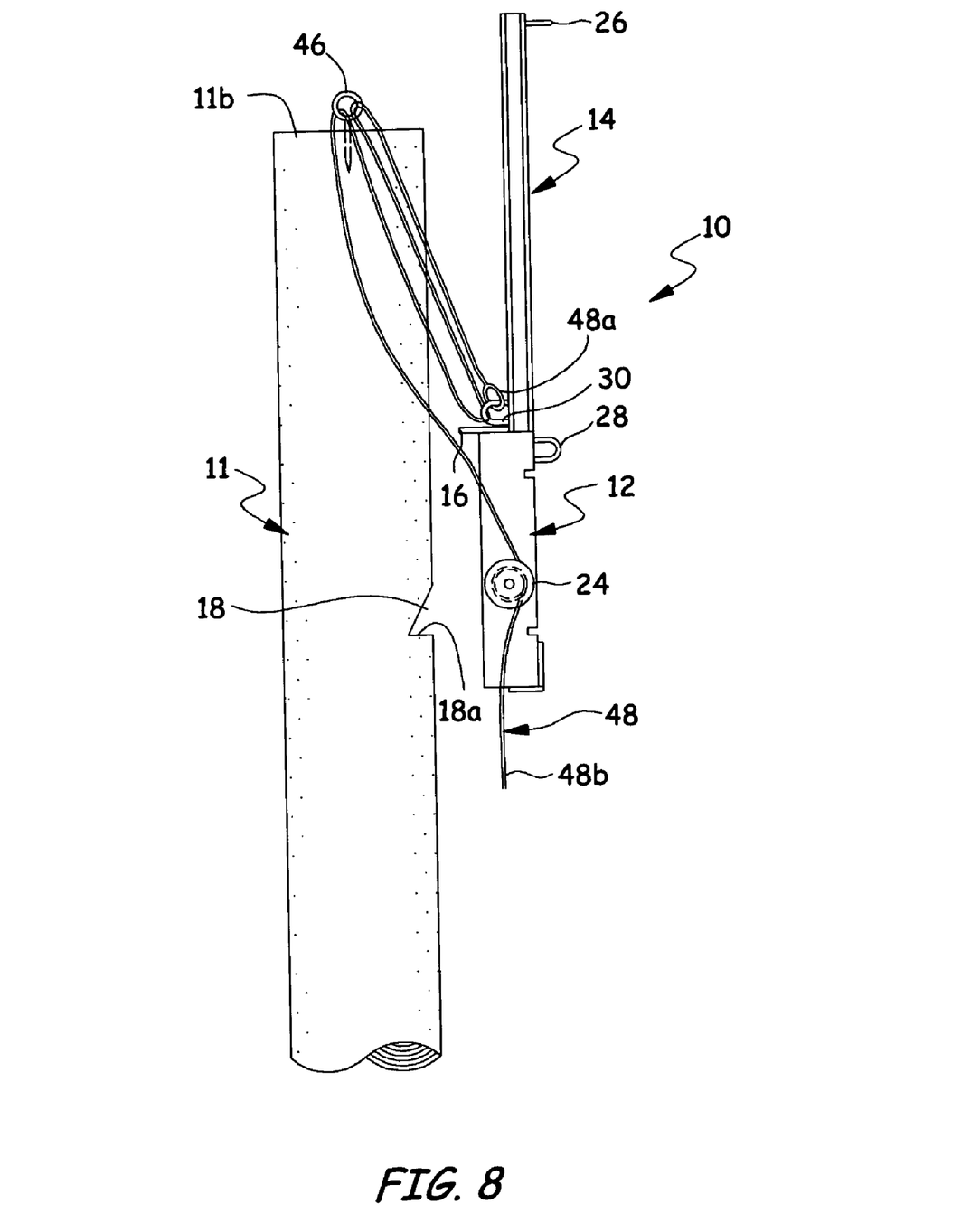
FIG. 8 is a perspective view of the preferred embodiment of a tree felling assembly during repositioning of the assembly along a tree trunk.

In either the first or second embodiment, the repositioning step may further comprise the steps of attaching an eye nut 46 to a bolt driven into the top portion of the trunk 11b, connecting a first end 48a of a positioning rope 48 to a lowering eyelet 30, threading a second end 48b of the positioning rope 48 through the eye nut 46 a first time, through the lowering eyelet 30, and then through the eye nut 46 a second time, and pushing the tree felling assembly 10 off of the trunk 11. Thereafter the positioning rope 48 may be selectively fed through the eye nut 46 to reposition the tree felling assembly 10, as generally shown in FIG. 8. The repositioning step may further comprise the step of looping a portion of the positioning rope 48 around a snubbing ring 24 affixed to the base 12 prior to the feeding step, for use in manually controlling the rate at which the positioning rope may be upwardly fed.

It is to be understood that the form of the invention shown is a preferred embodiment thereof and that various changes and modifications may be made therein without departing from the spirit of the invention or scope as defined in the following claims.

What is claimed is:

1. An assembly for felling a segment of a tree trunk having at least one notch with a lower surface, said assembly comprising in combination:
   a base,
   a horizontal lip connected to said base and projecting forward therefrom for contacting engagement with at least a portion of the lower surface,
   a mast connected to said base, said mast having at least a portion extending upwardly from said base,
   means for securing said base to the trunk, and
   a take-away cable operatively connected to said assembly.

2. An assembly for felling a segment of a tree trunk as described in claim 1 wherein said means for securing comprises at least one chain binder connected at opposite ends thereof to said base.

3. An assembly for felling a segment of a tree trunk as described in claim 1 further comprising a snubbing ring attached to said base.

4. An assembly for felling a segment of a tree trunk as described in claim 1 wherein said mast has a distal end, said assembly further comprising a top eyelet connected to said mast proximate the distal end thereof, and a first pulley block attached to said top eyelet.

5. An assembly for felling a segment of a tree trunk as described in claim 1 wherein said base has a storage compartment.

6. An assembly for felling a segment of a tree trunk as described in claim 1 further comprising a lowering eyelet positioned on said mast proximate said lip.

7. An assembly for felling a segment of a tree trunk as described in claim 1 wherein said base and said mast form a back surface, said assembly further comprising a back eyelet positioned on said back surface.

8. An assembly for felling a segment of a tree trunk as described in claim 7 wherein said take-away cable has an upper end connected to said back eyelet.

9. An assembly for felling a segment of a tree trunk as described in claim 8 further comprising a take-away pulley block operatively engaging said take-away cable.

10. An assembly for felling a segment of a tree trunk as described in claim 7 further comprising a second pulley block connected to said back eyelet, wherein said take-away cable engages said first pulley block and said second pulley block.

11. An assembly for felling a segment of a tree trunk as described in claim 10 further comprising a take-away pulley block engaging said take-away cable.

12. An assembly for felling a tree trunk in segments thereof comprising:
   a vertical support structure having an elongated base portion, an elongated mast portion connected to said base portion, and a horizontal lip extending from said base for contacting engagement with a notch formed in the trunk, and
   a take-away cable operatively connected to said vertical support structure, said take-away cable having at least a portion positioned above a drop zone.

13. An assembly for felling a tree trunk as described in claim 12 wherein said take-away cable has an upper end connected to a back eyelet positioned on a back surface of said vertical support structure.

14. An assembly for felling a tree trunk as described in claim 12 wherein said take-away cable has a distal end connected to segment, and said assembly further comprises a first pulley block and second pulley block operatively engaging said cable, said first pulley block being connected to the distal end of said mast portion and said second pulley block being connected to a back surface of said vertical support structure.

15. A method of felling a tree trunk, comprising the steps of
   positioning a tree felling assembly along said trunk, said assembly having a base, a horizontal lip connected to said base and projecting forward therefrom, and a mast connected to said base, said mast having at least a portion extending upwardly from said base,
   cutting a notch in said trunk below said assembly, said notch having a lower surface,
   repositioning said assembly along said trunk so that said lip is in contacting engagement with at least a portion of said lower surface,
   securing said assembly to said trunk below said segment,
   cutting said segment from said trunk, and
   lowering said segment from said trunk along a take-away cable operatively engaging said assembly.

16. A method of felling a tree trunk as described in claim 15 further comprising the steps of:
   affixing a first end of a lowering rope to said segment, and
   engaging said lowering rope with a first pulley block connected to said mast proximate a distal end thereof prior to said cutting step.

17. A method of felling a tree trunk as described in claim 16 further comprising the step of looping a portion of said lowering rope around a snubbing ring affixed to said base.

18. A method of felling a tree trunk as described in claim 16 further comprising the step of attaching said segment to a take-away pulley block operatively engaging said take-away cable prior to said lowering step, said take-away cable having a portion extending above a drop zone.

19. A method of felling a tree trunk as described in claim 17 further comprising the step of selectively feeding said lowering rope through said first pulley block concomitant with said lowering step.

20. A method of felling a tree trunk as described in claim 15 further comprising the step of selectively disengaging said segment from said take-away cable at said drop zone.

21. A method of felling a tree trunk as described in claim 15 further comprising the steps of:
   affixing a distal end of a take-away cable to said segment, and
   engaging said take-away cable with a first pulley block connected to said mast proximate a distal end thereof, and with a second pulley block connected to a back surface of said assembly prior to said cutting step.

22. A method of felling a tree trunk as described in claim 16 further comprising the step of attaching said segment to a take-away pulley block operatively engaging said take-away cable prior to said lowering step, said take-away cable having a portion extending above a drop zone.

23. A method of felling a tree trunk as described in claim 22 further comprising the step of selectively feeding said take-away cable through said first and second pulley blocks concomitant with said lowering step.

24. A method of felling a tree trunk as described in claim 23 further comprising the step of selectively disengaging said segment from said take-away cable at said drop zone.

25. A method of felling a tree trunk as described in claim 15 wherein said repositioning step comprises the steps of:
   attaching an eye nut to a top portion of said trunk,
   connecting a first end of a positioning rope to a lowering eye,
   threading a second end of said positioning rope through said eye nut a first time, said lowering eye, and said eye nut a second time,
   pushing said assembly off of said trunk, and
   selectively feeding said positioning rope through said eye nut.

26. A method of felling a tree trunk as described in claim 25 wherein said repositioning step further comprises the step of looping a portion of said positioning rope around a snubbing ring affixed to said base prior to said feeding step.

* * * * *